Dec. 26, 1922.
P. A. HERR.
FEED HOPPER FOR BOBBIN WINDING MACHINES.
FILED DEC. 26, 1919.
1,440,295.
2 SHEETS—SHEET 2.
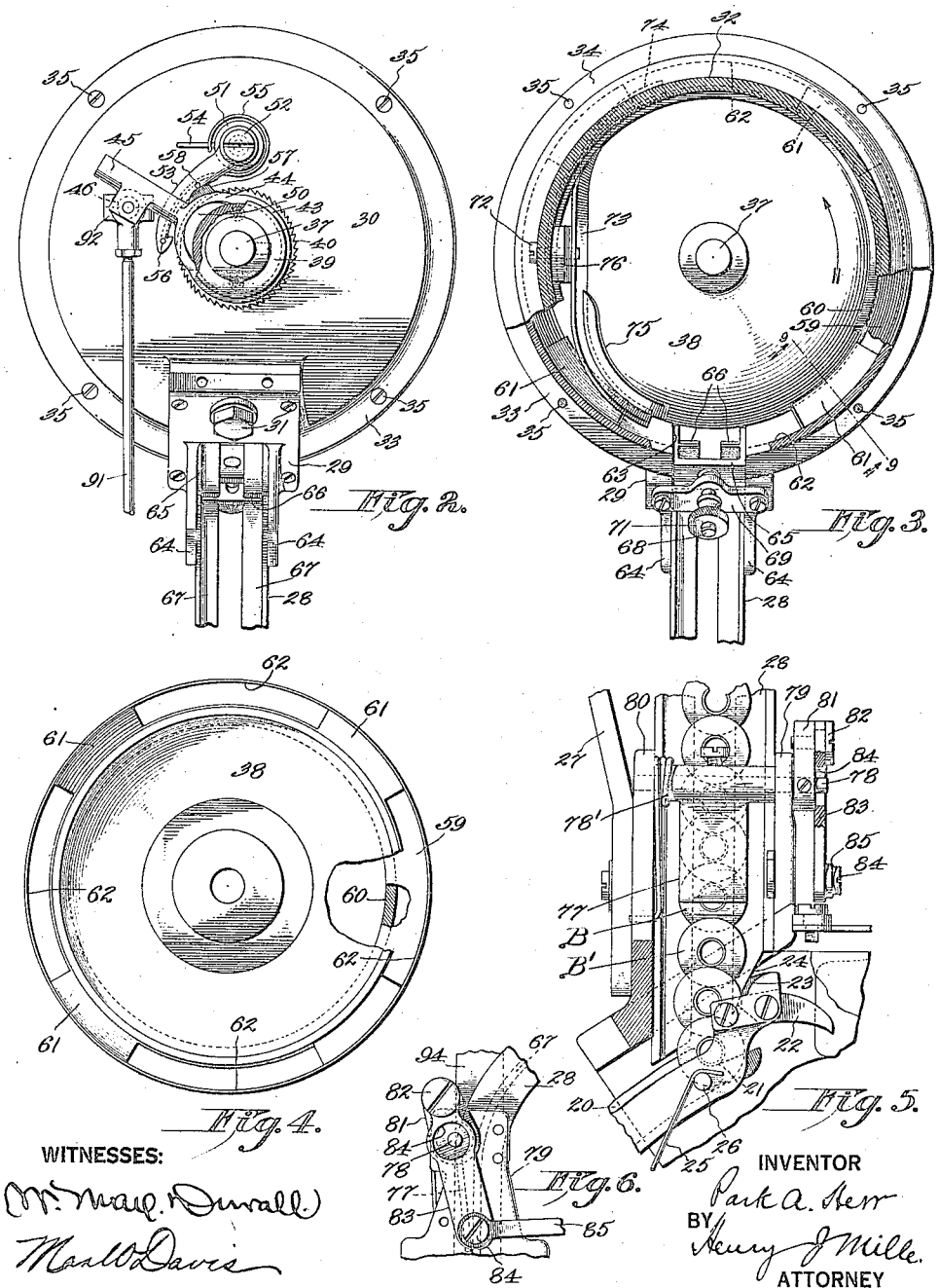
WITNESSES:
INVENTOR
Park A. Herr
BY
Henry J. Mille.
ATTORNEY Patented Dec. 26, 1922.

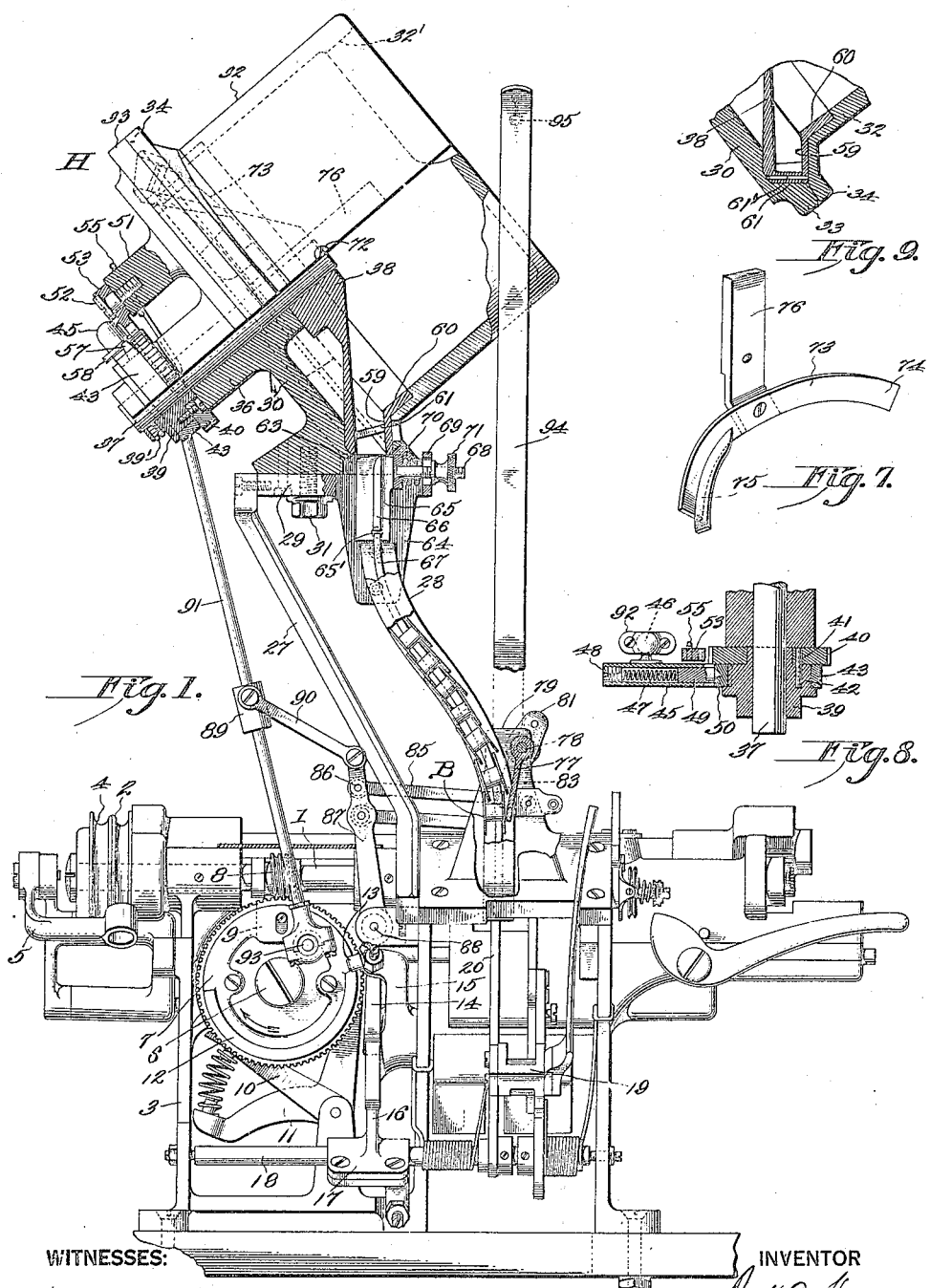

1,440,295

UNITED STATES PATENT OFFICE.

PARK A. HERR, OF HILLSIDE, NEW JERSEY, ASSIGNOR TO THE SINGER MANUFACTURING COMPANY, OF ELIZABETH, NEW JERSEY, A CORPORATION OF NEW JERSEY.

FEED HOPPER FOR BOBBIN-WINDING MACHINES.

Application filed December 26, 1919. Serial No. 347,553.

*To all whom it may concern:*

Be it known that I, PARK A. HERR, a citizen of the United States, residing at Hillside, in the county of Union and State of New Jersey, have invented certain new and useful Improvements in Feed Hoppers for Bobbin-Winding Machines, of which the following is a specification, reference being had therein to the accompanying drawings.

This invention relates to feeding hoppers and more particularly to a hopper for supplying empty bobbins or the like to a winding machine such as that disclosed in my copending application Serial No. 342,794, filed December 5, 1919. The broad features of my invention are not however limited to use in a feeding hopper for bobbins or the like, but are of general application.

One of the objects of my invention is to provide simple but improved means for arranging the bobbins or other articles in a feeding hopper so that they may all be discharged therefrom arranged in the same way, and in a uniform and reliable manner, and so that a continuous supply will be assured.

Another object of the invention is to provide a feeding hopper which will accommodate a large number of different sizes and shapes of bobbins, or the like, taking them indiscriminately and arranging them so that they will all be in the proper position when fed to the device to be supplied.

A further object of the invention is to provide means whereby should a bobbin or other article become jammed in the hopper it will not be crushed and will be released before further operation of the parts tending to crush it.

A still further object of the invention is to provide a device for supplying bobbins or other articles to a transferring means which will not allow them to cramp or jam on this transferring means, and thus interfere with its proper operation.

My invention in its preferred embodiment comprises a hopper adapted to receive the bobbins or other articles and which is provided with a discharge chute leading therefrom. Within the hopper is means for arranging the bobbins or other articles in proper position to pass into the discharge chute. Friction means is provided for intermittently operating the article arranging device and is so constructed that upon each operation the device is first moved in one direction preferably backwardly a certain amount and then forwardly a greater amount. The discharge chute is provided with yielding means adjacent its discharge end to sustain the weight of a majority of the bobbins or other articles in the chute off a transfer or other mechanism operating at this discharge end to prevent cramping or jamming thereon.

Referring to the accompanying drawings for a more detailed description of the invention, Fig. 1 is a rear elevation of a winding machine showing the hopper in position thereon parts being broken away to more clearly disclose the construction. Fig. 2 is a rear plan view of the hopper. Fig. 3 is a sectional plan view through the body portion of the hopper the lower half of the body portion being broken away. Fig. 4 is a bottom plan of a rotating cone element. Fig. 5 is a detail of the lower end of the chute leading from the hopper. Fig. 6 is a detail of a portion of the means for operating the bobbin sustaining means looking from the front of the machine. Fig. 7 is a perspective of a finger and guide located within the hopper. Fig. 8 is a detailed sectional view of the friction drive for the cone. Fig. 9 is a detail section of the lower edge of the hopper substantially on the line 9—9 of Fig. 3.

The hopper in its preferred form is intended for use with an automatic bobbin winding machine such as that disclosed in my copending application Serial No. 342,794, filed Dec. 5, 1919, of which machine Fig. 1 is a rear elevation. In this machine the bobbins are clamped between two clamping elements rotated by means of the shaft 1 which is driven by a belt pulley 2 secured thereto and is mounted in the frame 3. The shaft 1 has also a loose pulley 4 and mounted on the frame 3 is a belt shift 5 operating in a well known manner for starting and stopping the machine. Pivoted in the frame at 6 is a worm-gear 7 meshing with a worm 8 mounted on the shaft 1. The worm-gear has a movable section 9 which is normally held out of mesh with the worm 8 by means of a spring pressed latch which is controlled by the accumulation of thread upon the bobbin being wound. The worm-wheel operates mechanism for discharging the wound bobbin, cutting the thread and transferring the empty bobbin from the supply to the clamping elements and clamping the bobbin therein in winding position as more fully described in said copending application. The worm-wheel operates through pivoted levers 10 and 11 to retract one of the clamping elements to discharge the filled bobbin and is provided with a cam 12 operating through the roller stud 13 pivoted levers 14 and 15 and lug 16 of the collar 17 clamped on the pivoted shaft 18 to operate the transfer mechanism 19 for transferring an empty bobbin from the lower end of the chute to the winding point, all of which is more fully disclosed in said above mentioned copending application. The transfer mechanism includes a pivoted segmental member 20 the forward end of which is indicated in Fig. 5 as formed with a recess 21 adapted to receive an empty bobbin from the chute and transfer it to the winding point. Co-operating with the recessed end of the segmental member is a beak 22 having an abutment 23 coacting with the lower end 24 of the chute to hold it in an ineffective position when the transfer segment 20 is retracted as shown in Fig. 5. When the segmental member 20, however, is advanced the beak 22 is pressed downwardly by means of the spring 25 acting through the pin 26 to clamp the bobbin in the recess 21.

The hopper H is mounted above the machine on a support comprising members 27 and the chute 28 secured to the winding machine at their lower ends and supporting a bracket 29 at their upper ends. The base portion 30 of the hopper proper is mounted upon the bracket 29 by means of screws 31 and mounted upon the base portion 30 is a cylindrical body portion 32 provided with a receiving opening 32′. The base-portion and body portion have coacting flanges 33 and 34 respectively which are secured together by means of screws 35. The base portion is provided with alined bosses forming a bearing 36 for the shaft 37 which has secured to the end within the hopper the cone shaped member 38. On one end of the shaft is mounted the circular collar 39 which has mounted on a reduced portion thereof the ratchet 40 secured to the collar 39 by pins 41. The collar is secured to the shaft by set screws 39′. Mounted upon a second reduced portion 42 of the collar is a strap 43 provided with a bulged portion 44, Fig. 2, and a cylindrical extension 45. This cylindrical extension is provided with a ball stud 46 and embraces a coiled spring 47, Fig. 8, which abuts at one end against the adjusting screw 48 and at the other end against the slidable pin 49 bearing upon a crescent shaped friction block 50, the friction block 50 bearing upon the reduced portion 42 of the collar 39. The base portion 30 of the hopper is also formed with a boss 51, Fig. 2, pivotally mounted upon the end of which by means of the screw 52 is a pawl 53. The boss 51 is provided with a pin 54 and wound around this boss is a spring 55 secured at one end to the pin 54 and at the other end is let into an opening 56 adjacent the outer end of the pawl 53. This spring tends to force the pawl into engagement with the ratchet 40. The bulged portion 44 is also provided with a lug 57 cooperating with the pin 58 upon the pawl 53 to lift this pawl out of engagement with the ratchet at certain times in its operation as will presently be described.

The cone-shaped member 38 together with an angularly shaped element forms a substantially U-shaped groove one wall of which is in alinement with the surface of the cone and the other wall 59 of which is substantially parallel therewith. The angularly shaped element comprises the wall 59 and the extension 60 the inner wall of which is in substantial alinement with the inner surface of the wall of the body portion 32. This circular groove is opened to the interior of the hopper and the wall 59 is tied to the cone so as to rotate therewith by means of gates 61 at the bottom of this groove, the wall being secured to the gates by means of pins 61′ as shown in Fig. 9. These gates are spaced so as to form a series of openings 62 in the bottom of the groove. The body portion 30 of the hopper is provided at its lowest point with a discharge opening 63 leading to the chute 28. The gates 61 and openings 62 pass over this discharge opening 63 as the cone 38 and the wall 59 with its extension 60 are rotated.

Between the upper end of the chute 28 and the discharge opening 63 in the hopper and hinged or pivoted at 65′ to the ears 64 formed on the bracket 29 is an adjustable substantially U-shaped guide member 65 provided with guiding ribs 66 located at their lower ends in alinement with the ribs 67 of the chute 28. The upper portion of this U-shaped guiding member is provided with a stud 68 passing through an opening in the strap 69 mounted upon the bracket 29. The coiled spring 70 is placed between the strap 69 and the end of the guide 65 tending to force the upper end of the guide to the left as viewed in Fig. 1 and upon the outer end of the stud 68 is an adjusting screw 71.

Within the hopper and secured to the body portion 32 by means of the screw 72 is a guide or finger 73, one end 74 of which is bent downwardly and ends adjacent the bottom of the groove formed by the cone shaped member 38 and the wall 59. The other end of this finger is formed with an angularly extending guide 75 and the finger when placed in position extends to a short distance above the entrance to the guiding member 65 below the discharge opening of the hopper. The screw 72 extends into the supporting member 76 to the lower end of which finger 73 is secured.

At the lower portion of the chute 28, which chute is composed of two spaced T-shaped members, the standards of which are spaced sufficiently from each other to accommodate the cores of the bobbins, is pivotally mounted a gate 77 by means of a rod 78 extending through the bearing lugs 79 and 80 upon the frame 3 of the machine. Mounted upon and secured to one end of this rod 78 is a crank-arm 81 to the outer end of which is pivotally connected by means of screw 82 a link 83 having an enlarged opening 84 therein into which extends the end of the rod 78 as shown in Figs. 5 and 6. The lower end of the link 83 is pivotally connected at 84' to a link 85 pivoted at 86 to an arm 87 pivoted to the frame 3 at 88. The upper end of the arm 87 is connected to a collar 89 by means of the link 90, the collar 89 being mounted upon and secured to a rod 91, the upper end 92 of which embraces the ball stud 46 upon the extension 45 and the lower end of which embraces the ball-stud crank 93 upon the gear 7.

The member 94 represents a thread guide and has an eye 95 at its upper end for the passage of the thread to the bobbin being wound.

In the operation, as the thread accumulates upon the bobbin, the spring-pressed catch holding the gear segment 9 out of mesh with the worm 8 is released, allowing this segment to mesh with the worm and rotate the gear 7 in the direction indicated by the arrow. As this gear begins to rotate the pivoted levers 10 and 11 are operated to release the filled bobbin and operate a thread cutting and holding mechanism as described in my copending application above mentioned. After the gear has rotated a slight amount the edge of the opening 84 contacts the end of the rod 78 which then acts as a pivot for the link 83 and operates the arm 81 to swing the gate 77 about its pivot against the action of the spring 78' and allow the bobbins in the chute to drop down upon the top of the segmental member 20. This link 83 is operated from the rod 91 through the links 90 and 85. After the ball-stud crank 93 reaches the lower part of its path the gate 77 is closed as shown in Fig. 1 against the bobbins in the chute and sustains the weight of all the bobbins thereabove. The exact time of closing the gate, however, is not material except it should be closed before the segmental member 20 returns to its normal position as shown in Fig. 5 and before the stirring and shifting means in the hopper is operated in the forward direction. Further movement of the members 83, 84, 85, 90, 91 and 93 after the gate 77 is closed will have no effect thereon due to the enlarged opening 84.

It will be noted that on the beginning of the rotation of the gear 7 the ball-stud crank 93 moves downwardly and through the rod 91 pulls down the end of the extension 45 as shown in Fig. 2 as the pawl 53 is held out of engagement with the teeth of the ratchet 40 by means of lug 57 and pin 58. This ratchet and with it the shaft 37 and the cone 38 is moved counter-clockwise or backwardly as viewed in Fig. 2 by means of the friction drive member 50 until the pin 58 rides off the end of the extension 57 allowing the hook on the end of the pawl to engage with a tooth of the ratchet. The pawl then holds the ratchet and with it the cone 38 against further rotation in that direction and the friction member 50 then slides upon its contacting surface without operating the cone member. As the ball-stud crank 93 begins to rise after passing its lowest position in the rotation of the gear 7 the friction member 50 rotates the shaft clockwise or forwardly as viewed in Fig. 2, the hook on the end of the pawl merely riding over the teeth of the ratchet in a well known manner. The ratchet and with it the cone 38 are rotated clockwise until the ball-stud-crank 93 reaches its highest position, and the pin 58 rides upon the extension 57 lifting the pawl out of mesh with the ratchet just before this happens. If in the forward movement of the cone 38 and the wall 59 and gates 61 a bobbin becomes jammed, the friction drive merely slides without injuring the bobbin. Upon the next operation of the gear 7 as the first movement of the cone 38 and gates 61 is counter-clockwise or backwardly as viewed in Fig. 2 the bobbin is released before any forward or clockwise movement is imparted to the cone or its associated members. It will thus be seen that the stirring and shifting mechanism in the hopper is not operated continuously but is preferably operated reversely a small amount and forwardly a greater amount at each operation of the gear 7 and as this gear is operated intermittently the hopper mechanism will be operated intermittently also. The exact proportions are immaterial but in the embodiment shown the reverse movement is about one third of the forward movement at each operation and if there is no slipping of the friction drive due to jamming of the articles in the hopper the cone 38 and its associated elements is given one complete revolution in the forward direction with about seven rotations of the gear 7. It is further not necessary that the releasing motion of the stirring and shifting means be given at the beginning of the intermittent operation as it may be given at the end or at any other suitable time.

As the hopper is preferably placed with its axis on an angle of substantially 45° as shown in Fig. 1 the side walls of the body portion 32 sustain the greater part of the weight of the bobbins or other articles therein. As the cone 38 and gates 61 are rotated they tend to carry the bobbins or other articles upwardly over the center and if they were not in proper position to enter the groove and pass out the discharge opening, as they fall off the center of the cone the position is liable to be shifted giving them another opportunity to do so. Finger 73 pulls any bobbin or other article which remains in the groove upwardly toward the center of the cone and tends to guide properly positioned bobbins by means of the guide 75 to the discharge opening with the flanges of the bobbin on opposite sides of the guides 66. The circular groove in the cone-shaped member is of a width slightly greater than the length of the longest bobbin intended to be wound.

The adjustable hinged section 65 is provided so that when short bobbins are being used the entrance ends of the guide-ribs 66 may be so placed that the distance between them and the edge of the discharge opening 63 in the hopper is less than the combined length of two bobbins to prevent more than one bobbin passing out this opening at the same time.

After the gate 77 has released the bobbins and has been moved backwardly again into contact therewith, the cam 12 upon the gear 7 operates through the ball-stud 13 and levers 14, 15 and member 16, 17 to operate the transfer mechanism 19, the bobbins below the gate 77 merely riding upon the top of the segmental member 20. The bobbin within the recess 21, Fig. 5, is clamped at the winding point and left there as the segment 20 is retracted. As this recess 21 comes below the discharge end of the chute the bobbins below the gate 77, and which are not held thereby, drop downwardly, the lower one entering the recess 21. It will thus be seen that there is then a space between the lowest bobbin as B which is held by the gate 77 and the next lower bobbin B′ and if the bobbins are pressed downwardly in the chute by a gate 61 operating thereon at the discharge from the hopper, this movement will be taken care of by this space and the bobbins will not jam upon the segmental member 20 and thus interfere with its proper operation.

Having thus set forth the nature of the invention, what I claim herein is:—

1. In a device of the class described, a hopper, stirring means within the hopper, means including a to-and-fro moving friction drive for operating the stirring means, and means for arresting the motion of the stirrer in one direction before the friction drive reaches the limit of its motion.

2. In a device of the class described, a feeding hopper, rotary stirring means within the hopper, friction means for moving the stirring means alternately in opposite directions, and a stop movable into and out of engagement with the stirring means and operating to arrest the motion of the stirring means in one direction.

3. A hopper comprising a container provided with a discharge opening, a rotatable section within the container having an open groove with an opening in the bottom of the groove adapted to move over the discharge opening as the section is rotated, and means for turning said section alternately in opposite directions.

4. A hopper comprising a container having a discharge opening, a rotating section within the container having spaced circular walls defining between them a groove open to the space within the container and having an opening in its bottom adapted to move over the discharge opening, and means for rotating said section.

5. In an article feeding mechanism, a hopper, a chute leading from the hopper, a circularly moving stirrer within said hopper, a to-and-fro moving driver, and a slip-drive connection between said driver and stirrer operative to shift the latter alternately in opposite directions.

6. In a device of the class described a hopper, stirring means within the hopper, friction means for intermittently operating said stirring means and means whereby the stirring means at each operation is first moved frictionally in one direction and then in another direction a greater amount.

7. In a feeding mechanism, a receptacle for the articles to be fed, movable means within the receptacle for shifting a portion of the articles contained therein, and friction driving means for intermittently vibrating the movable means in opposite directions and adapted to become ineffective should any of the articles become jammed, said means operating to release the jammed article before a subsequent operation.

8. In a feeding mechanism, a receptacle for the articles to be fed provided with a discharge opening, means within the receptacle for shifting the articles to allow them to pass through the said opening, and driving means for operating the shifting means and adapted to yield should an article become jammed, said driving means including motion reversing means, whereby the article is released before subsequent normal operation of the shifting means.

9. In a feeding mechanism, a receptacle adapted to receive a plurality of elements, means for shifting a portion of the said elements, and yielding means for operating the shifting means alternately in opposite directions, whereby should an element become jammed it will be released before further normal operation of the shifting means.

10. In a device of the class described a receptacle provided with a discharge opening, a rotatable element within the receptacle provided with a circular groove having an opening in the bottom thereof adapted to move over the discharge opening as said element is rotated, said element also including a conical member mounted with its axis inclined and adapted to rotate therewith, and means for rotating said element and conical member.

11. In a device of the class described, a receptacle provided with a discharge opening, a rotatable element within the receptacle having a groove open to the space within the receptacle and provided with an opening in the bottom thereof adapted to move over the discharge opening, said element including a conical member mounted with its axis inclined and adapted to rotate therewith, means for rotating the element and cone and means for shifting articles in the groove toward the apex of the cone, as the cone and element are rotated.

12. In a feeding mechanism, a receptacle provided with a discharge opening, a chute leading from the said opening and provided with a hinged portion immediately adjacent said opening, as and for the purpose specified.

13. In a feeding mechanism, a receptacle provided with a discharge opening, a chute leading from said opening and having an adjustable portion adjacent said opening and means for adjusting said portion.

14. In a feeding mechanism, a receptacle for articles to be fed, a chute leading therefrom, means for transferring the articles from the chute and means in the chute for sustaining the weight of a majority of the articles therein off the transferring means.

15. In a feeding mechanism, a receptacle for articles to be fed, a chute leading therefrom, an agitator within the receptacle, means for transferring articles from the chute and yielding means in the chute for sustaining the weight of the majority of the articles therein and thus prevent jamming of the articles on the transferring means.

16. In a feeding mechanism, a receptacle for articles to be fed, a chute leading therefrom, an agitator within the receptacle, means movable to transfer an article from the chute and back to receive another article therefrom, means in the chute for normally sustaining the articles therein but operable to allow the articles to pass through the chute to the transfer means and means for operating the sustaining means, transfer means and agitator in the order named.

In testimony whereof I have signed my name to this specification.

PARK A. HERR.